UNITED STATES PATENT OFFICE.

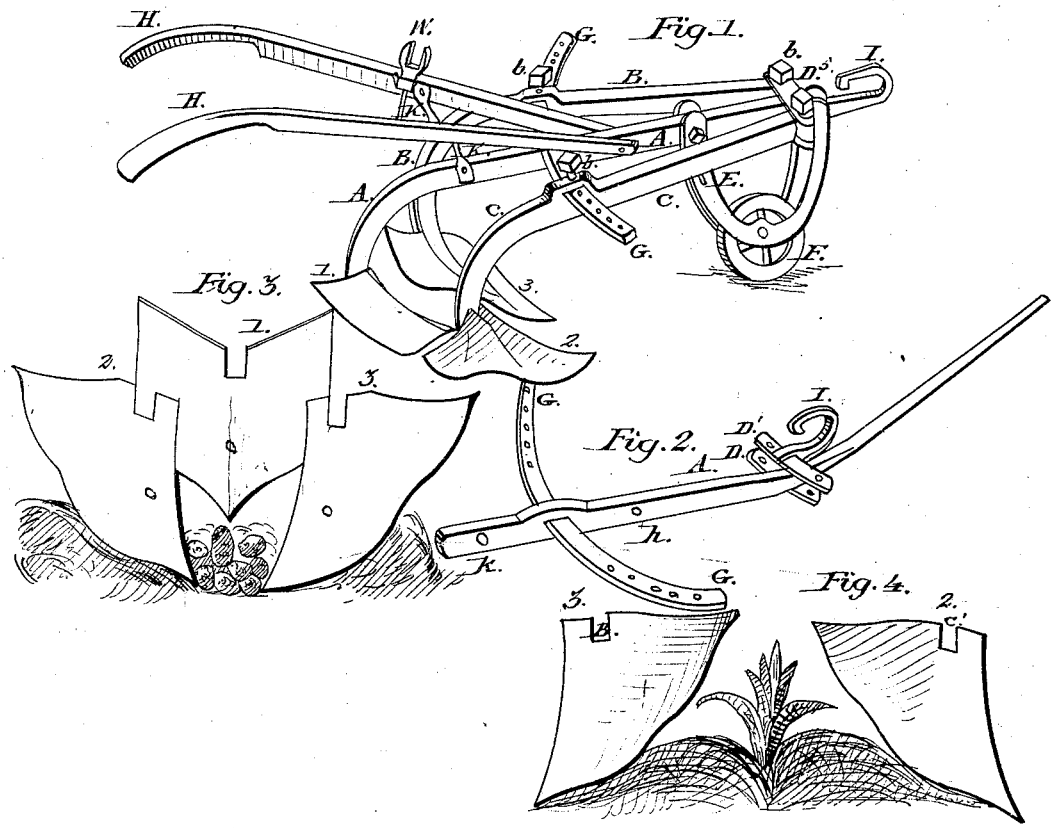

MICHAEL STOLL, OF CONESTOGA TOWNSHIP, LANCASTER COUNTY, ASSIGNOR TO HIMSELF, BENJAMIN SNAVELY, AND ANTHONY ISKE, OF LANCASTER, PENNSYLVANIA.

IMPROVEMENT IN POTATO-PLOWS.

Specification forming part of Letters Patent No. 82,043, dated September 8, 1868.

*To all whom it may concern:*

Be it known that I, MICHAEL STOLL, of Conestoga township, in the county of Lancaster and State of Pennsylvania, have made certain Improvements on a Potato-Plow Convertible into a Cultivator; and I hereby declare that the following is a full and exact description of the construction and operation of the same, reference being had to the accompanying drawings, making a part of this specification, in which—

Figure 1 is a perspective view of my potato-plow; Fig. 2, the shifting center piece and pole. Fig. 3 shows the position of the three shovels, peculiarly adapted to plowing out potatoes; Fig. 4, the two outer shovels and their beams reversed, the peculiar shape especially adapted for dressing corn, (the central shovel and beam removed for that purpose,) and the pole, Fig. 2, applied instead.

The nature of my invention consists in the manner of adjusting my side beams, and in the peculiar construction of my shovels for removing the soil from the sides of a row of potatoes, and then turning up the row, so as to throw the potatoes to the surface, by reversing said shovel on a separate center beam—that is, the right-hand shovel and beam of the one comes on the left-hand side of the other, used in one case for throwing the soil from the row and in the other to the row.

To enable any one skilled in the art to make and use my invention, a brief explanation will suffice.

The general construction is common to numerous cultivators now in use, differing, however, in the construction of the shovels and arrangement of the shifting device.

For a potato-plow (Fig. 1 shows the arrangement) I employ square-headed screw-bolts $b$, of a uniform size, so that one wrench, W, (held in a loop on the handles,) will fit them all. The central beam, A, in the form of hook behind, has the plow-shovel 1, adapted for getting under and turning up the potatoes, while the side beams, B C, are provided with shovels 3 2, with their inner edges nearly parallel to each other, the sides rounded up and turned off into side wing-like prolongations. These remove the soil by cutting down the sloped sides of the hilled row and throwing the soil outward to give the central shovel, 1, a clean sweep for turning out the contents of the said row. These wings or side beams, B C, are made adjustable by means of a segment-bar, G, affixed to the center-beam, and sliding through slots in the side beams, and are provided with dished holes to receive the end of a headed screw, $b$, which has its bearing in a female screw cut into the raised portion over the said slot, as shown, which holds the adjusted beams in place, according to the width of the hill or row. The collar-braces D D' are affixed to the central beam, A, between which the side beams are held, and move upon the headed bolts $b$. This central beam has two adjustable ovate segments, E, with a slot-and-bolt attachment for the bearing of a pulley-wheel, F, and said beam is also prolonged into a hook, I, for the attachment of a horse. This combination forms an admirable implement for unearthing potatoes or the like.

The separate center beam referred to is not provided with a shovel, but may be prolonged into a pole, $a$ A, Fig. 2, and has a segment-bar, G, and the collar-plates D D' attached, and is also provided with holes $k h$, for the bolts to fasten the handles to the same. Thus it is adapted to receive the side beams, B C, with their respective shovels, 3 2, and the handles H. The side beams are, however, reversed in their position, so that the straight or winged sides of said shovels are now brought to the outside, or farthest from the row, and, properly adjusted, will be found fitted in a peculiar manner to throw the soil inward, and to the roots of the standing corn, from each side, as illustrated by Fig. 4, and forms an implement admirably adapted for dressing corn.

I am aware that hinged and adjustable side beams with variously-fashioned shovels are in use, as well as pulley-wheels in front, nor do I claim such. The novelty of my invention consists in the manner of making the adjustability of the side beams and pulley-bearings and the peculiar form of my shovels, so that in one position the soil is thrown outward, and when reversed to throw the same inward.

Useful as I know my arrangement to be, I am aware of the numerous inventions already patented, and must consequently confine myself simply to the arrangement of the whole combination, as differing substantially from others, considered as a whole; therefore

What I claim as my invention, and desire to secure by Letters Patent, is—

The arrangement and construction of my shovels 1, 2, and 3, with their respective beams, slots, screw-bolts b, and countersunk segment G, and adjustable bearings E, in combination with or without the separate center piece, A, Fig. 2, all made in the manner and for the purpose specified.

MICHAEL STOLL.

Witnesses:
WM. B. WILEY,
JACOB STAUFFER.